United States Patent
Song et al.

(10) Patent No.: US 7,817,533 B2
(45) Date of Patent: Oct. 19, 2010

(54) DEVICE AND METHOD FOR PERFORMING CHANNEL ESTIMATION FOR OFDM-BASED SIGNALS WITH VARIABLE PILOT SUBCARRIER SPACING

(75) Inventors: Kee-Bong Song, Santa Clara, CA (US); Chaohuang Zeng, Sunnyvale, CA (US); Won-Joon Choi, Cupertino, CA (US)

(73) Assignee: Amicus Wireless Technology Ltd. (KY)

( * ) Notice: Subject to any disclaimer, the term of this patent is extended or adjusted under 35 U.S.C. 154(b) by 800 days.

(21) Appl. No.: 11/621,965

(22) Filed: Jan. 10, 2007

(65) Prior Publication Data

US 2007/0159959 A1    Jul. 12, 2007

Related U.S. Application Data

(60) Provisional application No. 60/757,908, filed on Jan. 11, 2006.

(51) Int. Cl.
    *H04J 11/00*    (2006.01)
(52) U.S. Cl. .............. 370/208; 370/203; 370/206; 370/343; 370/338
(58) Field of Classification Search ............ 370/208, 370/203, 338, 206, 343
    See application file for complete search history.

(56) References Cited

U.S. PATENT DOCUMENTS

| | | | |
|---|---|---|---|
| 6,985,535 B2* | 1/2006 | Park et al. | 375/260 |
| 7,209,433 B2* | 4/2007 | Scarpa | 370/206 |
| 2002/0122381 A1 | 9/2002 | Wu et al. | |
| 2002/0145971 A1 | 10/2002 | Cho et al. | |
| 2003/0072254 A1 | 4/2003 | Ma et al. | |
| 2003/0227866 A1 | 12/2003 | Yamaguchi | |
| 2004/0086027 A1 | 5/2004 | Shattil | |
| 2005/0135324 A1* | 6/2005 | Kim et al. | 370/343 |
| 2005/0147025 A1* | 7/2005 | Auer | 370/203 |
| 2005/0163257 A1 | 7/2005 | Keerthi | |
| 2005/0176436 A1 | 8/2005 | Mantravadi et al. | |
| 2005/0201268 A1* | 9/2005 | Aoki et al. | 370/208 |
| 2005/0259565 A1* | 11/2005 | Fujii et al. | 370/203 |
| 2006/0062317 A1* | 3/2006 | Chang et al. | 375/260 |
| 2006/0203710 A1 | 9/2006 | Mukkavilli et al. | |

* cited by examiner

*Primary Examiner*—Charles N Appiah
*Assistant Examiner*—Michael T Vu
(74) *Attorney, Agent, or Firm*—Thomas H. Ham; Wilson & Ham

(57) ABSTRACT

A device and method for performing channel estimation for an OFDM-based wireless communication system modifies pilot subcarrier spacing to use a set of interpolation coefficients associated with a different pilot subcarrier spacing.

20 Claims, 8 Drawing Sheets

DEVICE AND METHOD FOR PERFORMING CHANNEL ESTIMATION FOR OFDM-BASED SIGNALS WITH VARIABLE PILOT SUBCARRIER SPACING

CROSS REFERENCE TO RELATED APPLICATION

This application is entitled to the benefit of U.S. Provisional Patent Application Ser. No. 60/757,908 filed on Jan. 11, 2006, which is incorporated herein by reference.

BACKGROUND OF THE INVENTION

Orthogonal Frequency Division Multiple Access (OFDMA) technology is getting very popular in modern communication systems since the OFDMA technology can efficiently support multiple mobile stations with limited bandwidth and easily provide Quality of Service (QoS). The OFDMA technology is a multiple access version of orthogonal frequency-division multiplexing (OFDM). OFDM is a modulation technique for data transmission based on frequency-division multiplexing (FDM), which uses different frequency channels to transmit multiple streams of data. In OFDM systems, a wide channel is divided into multiple narrow-band subcarriers, which allow orthogonal modulated streams of data to be transmitted in parallel on the subcarriers.

In OFDMA systems, multiple subscribers can simultaneously use different subcarriers for signal transmission. Thus, in an OFDMA system, multiple data bursts can be transmitted from a base station to multiple mobile stations in the same time frame but allocated in different frequency subcarriers. Consequently, an OFDMA system can support multiple mobile stations using different subcarriers.

Since OFMDA systems are wireless communication systems, the transmitted signals experience multi-path fading and delay across the system bandwidth due to what is commonly referred to as signal channels. In order to compensate for the effects of these signal channels, OFDMA receivers perform channel estimations using pilot signals embedded in the transmitted signals. Since the pilot signals are known signals, channel estimates for the pilot signals can be derived. Using the channel estimates for the pilot signals, channel estimates for data signals can be extracted by interpolation. If there is significant error in the resulting channel estimates, the received data will be erroneously decoded. In other words, the original modulation symbol will be decoded in error if there is significant error in the channel estimation because each subcarrier in the OFDMA symbol is multiplied by a different fading coefficient that has a unique amplitude and phase. This is especially true for higher-order quadrature amplitude modulation (QAM), such as 16-QAM and 64-QAM, which is used to transmit high data rate signals.

In OFDMA systems, OFDMA signals may have different pilot subcarrier spacing within one OFDMA symbol or between different OFDMA symbols. In order to process OFDMA signals with variable pilot subcarrier spacing, multiple interpolation schemes may be needed to derive data channel estimates from pilot channel estimates having different pilot subcarrier spacing, which require significant design and maintenance demands, as well as large receiver memory.

Thus, there is a need for a device and method for performing channel estimation for an OFDM-based wireless communication system with variable pilot subcarrier spacing that reduces design and maintenance demands, as well as receiver memory.

SUMMARY OF THE INVENTION

Embodiments of a device and method of performing channel estimation for an OFDM-based wireless communication system are described. In some embodiments, the device and method modifies pilot subcarrier spacing to use a set of interpolation coefficients associated with a different pilot subcarrier spacing. In some embodiments, the use of a standardized interpolation coefficient set results in less memory usage. In some embodiments, the use of a standardized interpolation coefficient set also results in less computational processing otherwise performed for different interpolation coefficient sets and different pilot subcarrier spacing. Additionally, embodiments of the device and method facilitates channel estimation for variable pilot subcarrier spacing, whether the spacing varies within one OFDMA symbol or among different OFDMA symbols.

A channel estimation device in accordance with an embodiment of the invention includes a pilot channel estimator and a data channel estimator. The pilot channel estimator is configured to compute pilot channel values for pilot signals of an incoming OFDM-based signal. The pilot channel values are arranged in a first pilot subcarrier spacing. The pilot channel estimator is configured to modify the first pilot subcarrier spacing to match a second pilot subcarrier spacing different from the first pilot subcarrier spacing. The data channel estimator is coupled to the pilot channel estimator. The data channel estimator is configured to compute a plurality of data channel values for data signals of the incoming OFDM-based signal from the pilot channel values using a set of interpolation coefficients associated with the second pilot subcarrier spacing.

A method for performing channel estimation for an OFDM-based wireless communication system in accordance with an embodiment of the invention includes receiving an incoming OFDM-based signal including data and pilot signals, where the pilot signals are arranged in a first pilot subcarrier spacing, modifying the first pilot subcarrier spacing to match a second pilot subcarrier spacing different from the first pilot subcarrier spacing, and computing a plurality of data channel values for the modified first pilot subcarrier spacing according to a set of interpolation coefficients associated with the second pilot subcarrier spacing.

An OFDM-based receiver in accordance with an embodiment of the invention comprises means for receiving an OFDM-based signal, the OFDM-based signal including data and pilot signals, the pilot signals arranged in a first pilot subcarrier spacing, and means for using a set of interpolation coefficients to interpolate channel values of data channel estimates, wherein the set of interpolation coefficients corresponds to an effective pilot subcarrier spacing different from the first pilot subcarrier spacing.

Other aspects and advantages of the present invention will become apparent from the following detailed description, taken in conjunction with the accompanying drawings, illustrated by way of example of the principles of the invention.

DETAILED DESCRIPTION

Figure 1:
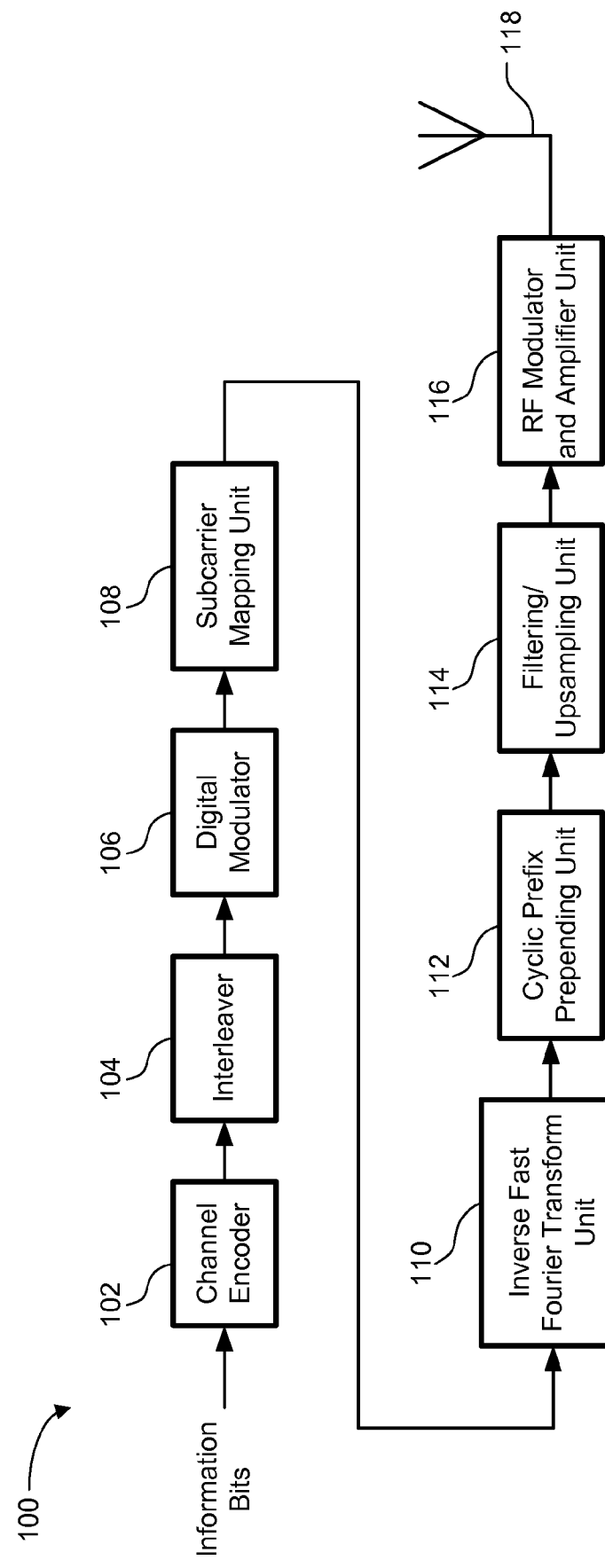
FIG. 1 is a block diagram of an Orthogonal Frequency Division Multiple Access (OFDMA) transmitter in accordance with an embodiment of the invention.

With reference to FIG. 1, an Orthogonal Frequency Division Multiple Access (OFDMA) transmitter 100 in accordance with an embodiment of the invention is described. The OFDMA transmitter 100 is part of an OFDMA wireless communication system. As an example, the OFDMA transmitter 100 may be a component of a base station of an OFDMA wireless communication system.

As shown in FIG. 1, the OFDMA transmitter 100 includes a channel encoder 102, an interleaver 104, a digital modulator 106, a subcarrier mapping unit 108, an inverse fast Fourier transform (IFFT) unit 110, a cyclic prefix prepending unit 112, a filtering/upsampling unit 114, a radio frequency (RF) modulator and amplifier unit 116 and a transmit antenna 118. The channel encoder 102 is configured to encode information bits using an encoding scheme, such as convolutional coding, turbo coding, block coding or other well-known forward error correction (FEC) encoding scheme. The interleaver 104 is configured to interleave the encoded bits to provide additional protection against burst errors due to deep channel fading. The digital modulator 106 is configured to map the encoded and interleaved bits into modulation symbols of a modulation scheme, such as quadrature phase shift keying (QPSK), M-ary quadrature amplitude modulation (M-QAM) or M-ary phase shift keying (M-PSK). The subcarrier mapping unit 108 is configured to map the modulation symbols into data subcarriers in the frequency domain.

The number of data subcarriers in one OFDMA symbol depends on the size of fast Fourier transform (FFT) being used, the number of guard subcarriers and the number of pilot subcarriers. A group of N subcarriers, which includes data subcarriers, DC/guard subcarriers and pilot subcarriers, forms a single OFDMA symbol, where N is the FFT size.

The IFFT unit 110 is configured to transform the N subcarriers into the time-domain by IFFT so that the OFDMA symbols are suitable for sending through the wireless propagation environment. For each OFDMA symbol, the cyclic prefix prepending unit 112 is configured to prepend the last M samples at the beginning of each symbol to generate a cyclic prefix (CP). This CP serves as a guard period to eliminate the inter-symbol-interference (ISI) between OFDMA symbols in a multi-path fading environment. The filtering/upsampling unit 114 is configured to filter and up-sample the CP-added OFDMA symbols for the purpose of pulse shaping. The RF modulator and amplifier unit 116 is configured to convert the symbols to an RF signal and to amplify the signal for transmission through the wireless fading environment via the transmit antenna 118.

Figure 2A:
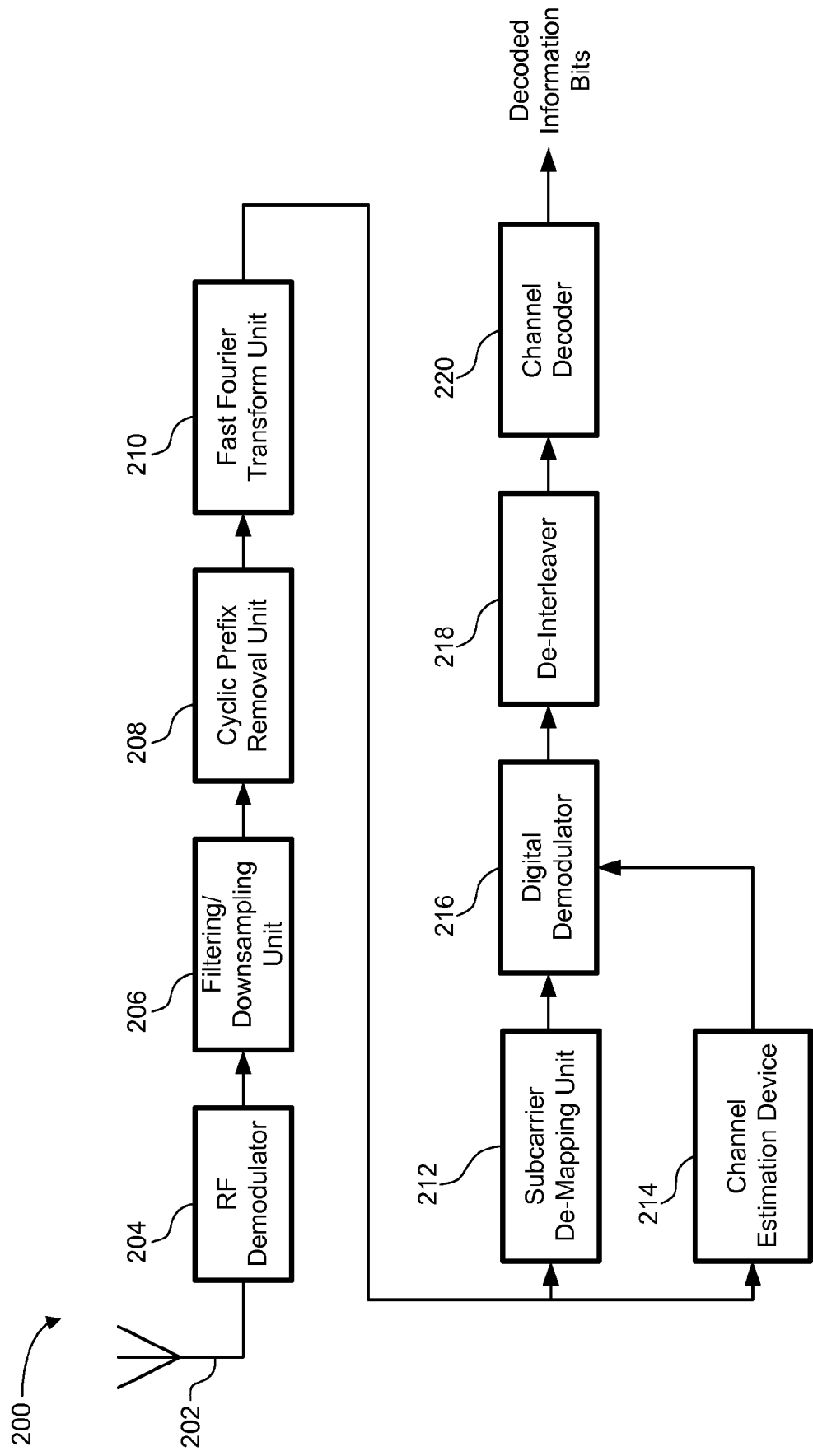
FIG. 2A is a block diagram of an OFDMA receiver in accordance with an embodiment of the invention.

Turning now to FIG. 2A, an OFDMA receiver 200 in accordance with an embodiment of the invention is shown. The OFDMA receiver 200 is also part of an OFDMA wireless communication system. As an example, the OFDMA receiver 200 may be a component of a mobile station of an OFDMA wireless communication system.

As shown in FIG. 2A, the OFDMA receiver 200 includes a receive antenna 202, an RF demodulator 204, a filtering/downsampling unit 206, a cyclic prefix removal unit 208, a FFT unit 210, a subcarrier de-mapping unit 212, a channel estimation device 214, a digital demodulator 216, a de-interleaver 218 and a channel decoder 220. The RF demodulator 204 is configured to demodulate the incoming RF signal received by the receive antenna 202. The filtering/downsampling unit 206 is configured to filter and down convert the RF-demodulated signal to a baseband signal. The cyclic prefix removal unit 208 is configured to remove the samples for the CP portion of the received signal. The FFT unit 210 is configured to apply FFT on N received samples per OFDMA symbol to generate N received subcarriers per OFDMA symbol in the frequency domain.

The subcarrier de-mapping unit 212 is configured to de-map the generated subcarriers to extract the subcarriers intended for this particular OFDMA receiver 200. The channel estimation device 214 is configured to compute frequency-domain channel estimates for the pilot subcarriers and then to interpolate the pilot channel estimates to derive frequency-domain channel estimates for the data subcarriers, as described in more detail below. The digital demodulator 216 is configured to demodulate the received modulation symbols in the data subcarriers using the frequency-domain channel estimates for the data subcarriers from the channel estimation device 214. The digital demodulator 216 compensates for the signal attenuation and phase rotation of each subcarrier from the channel estimates. The demodulator output is a hard or soft decision of encoded bits. The de-interleaver 218 is configured to de-interleave the bit decisions, while the channel decoder 220 is configured to decode the de-interleaved bit decisions to extract the original information bits.

Although the components 102-116 of the OFDMA transmitter 100 and the components 204-220 of the OFDMA receiver 200 are illustrated and described herein as separate units, these components represent functional blocks, and consequently, may or may not be embodied in the form of physically separate units within the OFDMA transmitter 100 or the OFDMA receiver 200. Thus, some of these components may be combined into integrated modules. Alternatively, one or more of these components may be divided into two or more modules. Furthermore, these components may be implemented in any combination of hardware, firmware and/or software.

Figure 2B:
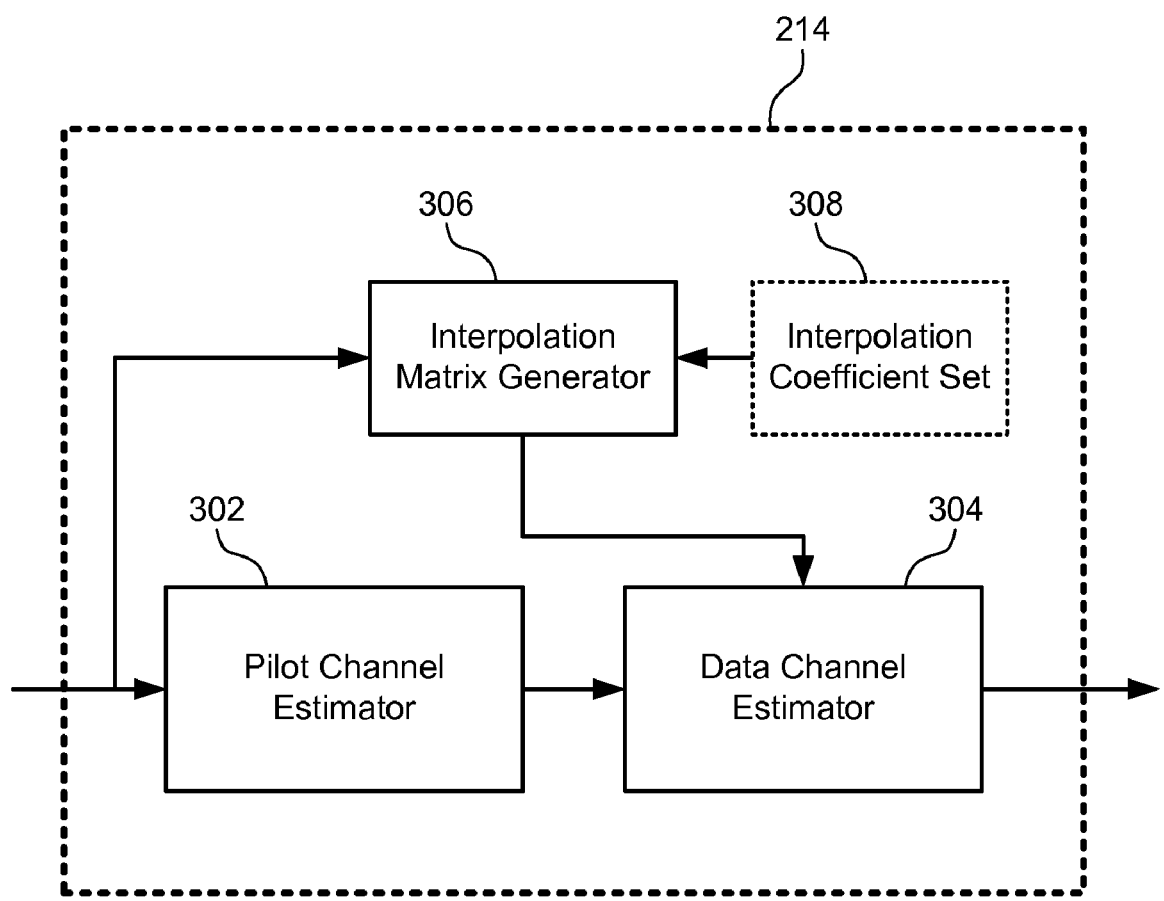
FIG. 2B is a block diagram of a channel estimation device of the OFDMA receiver in accordance with an embodiment of the invention.
Figure 3A:
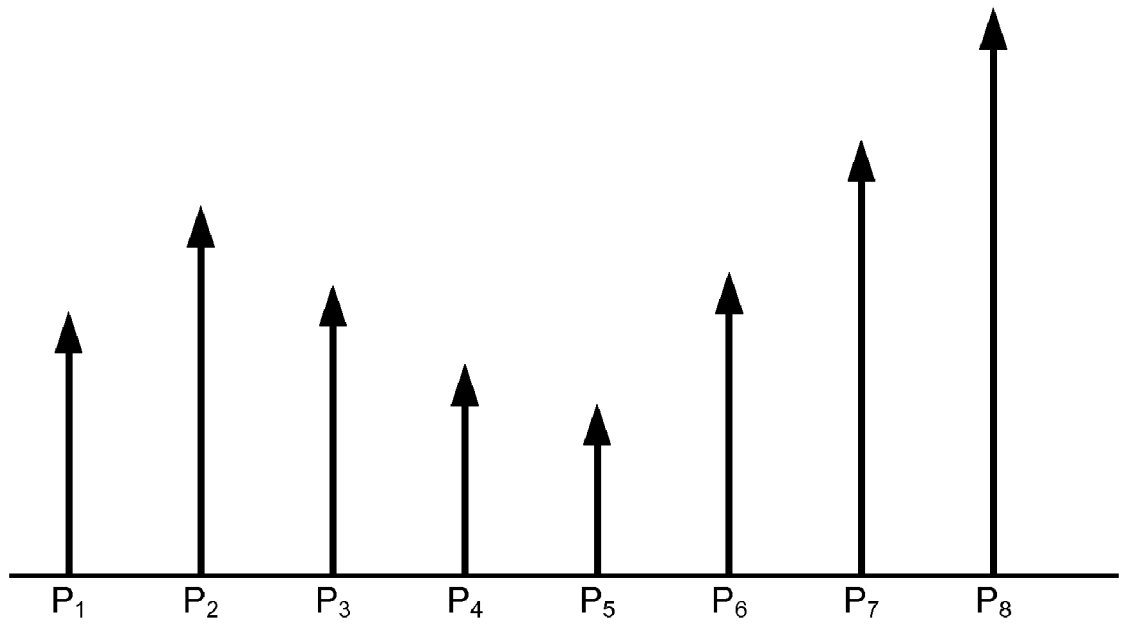
FIG. 3A illustrates estimated pilot channel values at pilot subcarrier locations for the pilot signals in accordance with an embodiment of the invention.
Figure 3B:
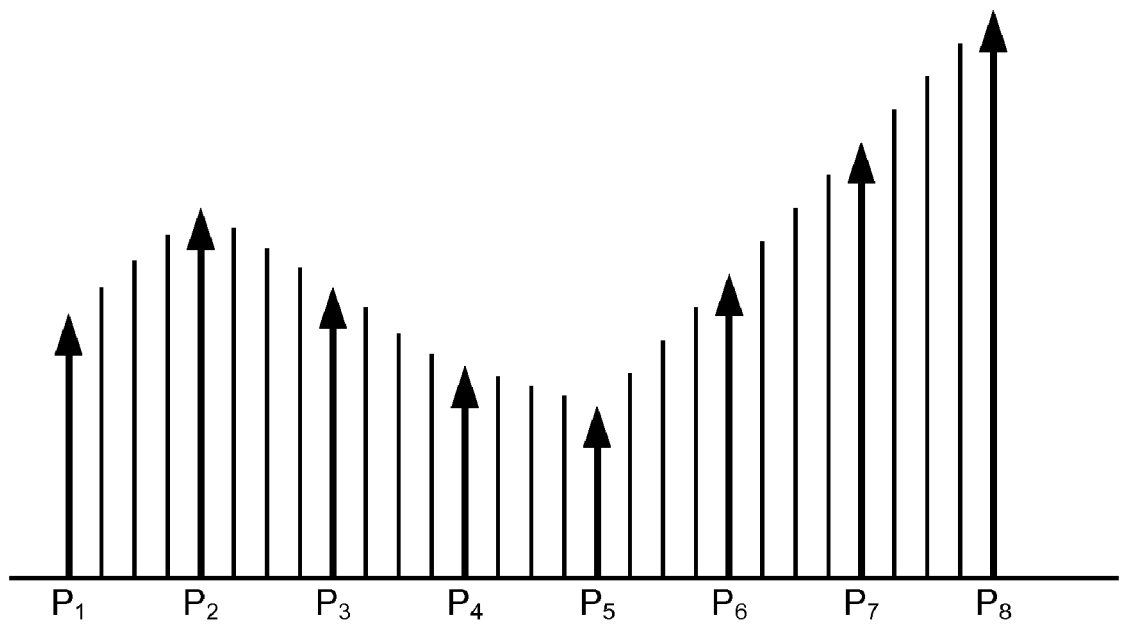
FIG. 3B illustrates estimated data channel values at the data subcarrier locations, which are interpolated from the estimated pilot channel values, in accordance with an embodiment of the invention.

Turning now to FIG. 2B, the channel estimation device 214 in accordance with an embodiment of the invention is shown. In this embodiment, the channel estimation device 214 includes a pilot channel estimator 302 and a data channel estimator 304. The pilot channel estimator 302 is configured to compute pilot channel estimates at pilot subcarrier locations $P_1, P_2 \ldots$ for the pilot signals, as illustrated in FIG. 3A. The pilot subcarrier locations are spaced such that a number of data subcarrier locations are situated between adjacent pilot subcarrier locations. As an example, three data subcarrier locations may be situated between adjacent pilot subcarrier locations. The data channel estimator 304 is configured to interpolate between the pilot channel estimates to derive data channel estimates for the data signals at each of the data subcarrier locations, as illustrated in FIG. 3B. The data channel estimates can then be used to compensate for the signal attenuation and phase rotation for each data subcarrier.

The pilot channel estimator 302 uses the pilot subcarriers in the received signal to estimate pilot channel values at the locations of these pilot subcarriers. The pilot channel estimator 302 may use a known technique to derive the estimated pilot channel values at the pilot subcarrier locations. These estimated pilot channel values at the pilot subcarrier locations are illustrated in FIG. 3A. As an example, the pilot channel estimator 302 may use a pilot channel estimation scheme based on Least Square (LS) or Minimum Mean-Square (MMSE) to derive the estimated pilot channel values at the pilot subcarrier locations. As described in more detail below, the pilot channel estimator 302 is configured to modify the pilot subcarrier spacing or pattern to reduce the number of data channel estimation schemes needed to interpolate estimated data channel values from the estimated pilot channel values.

The data channel estimator 304 uses the estimated pilot channel values at the pilot subcarrier locations to estimate data channel values at data subcarrier locations between the pilot subcarrier locations. As an example, the data channel estimator 304 may LS, linear, cubic, or polynomial interpolation, or another data channel estimation scheme to interpolate the data channel values at the data subcarrier locations.

In one embodiment, the data channel estimator 304 is coupled to an interpolation matrix generator 306 which operates to provide one or more interpolation coefficient sets 308 to the data channel estimator 304. Each interpolation coefficient set 308 corresponds to a particular pilot subcarrier spacing. For example, one interpolation coefficient set 308 is used to estimate data channel values based on a pilot subcarrier spacing of three, and a different interpolation coefficient set 308 is used to estimate data channel values based on a pilot subcarrier spacing of six.

Figure 5A:
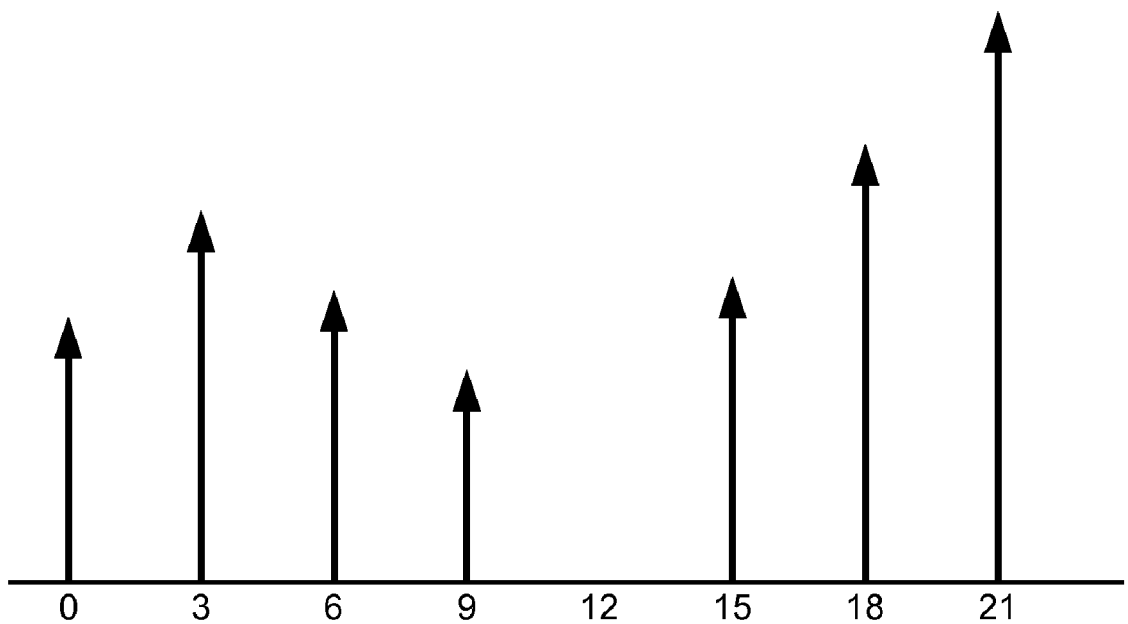
FIG. 5A illustrates pilot subcarrier spacing with a missing pilot subcarrier at the twelfth subcarrier index in accordance with an embodiment of the invention.

Additionally, other interpolation coefficient sets 308 are used to estimate data channel values based on variable pilot subcarrier spacing. Pilot subcarrier spacing may be variable within one OFDMA symbol or across different OFDMA symbols for different communication purposes. For example, the preamble pilot symbols of an OFDMA symbol typically include a direct current (DC) subcarrier which is zero-valued at the transmitter, as shown in FIG. 5A. A zero-valued subcarrier is one type of "missing" subcarrier. In other examples, OFDMA symbols in different subcarrier permutation zones may have different pilot spacing. Also, pilot locations may be offset across different OFDMA symbols, as shown in FIGS. 6B and 6C.

Storing several interpolation coefficient sets 308 in the receiver memory impacts memory requirements and affects the complexity of the receiver 200. While it is possible to pre-compute and store a unique interpolation coefficient set 308 in the receiver memory for each unique pilot subcarrier spacing, some embodiments implement a channel estimation scheme to reduce the design and maintenance demands for multiple interpolation schemes for different pilot spacing scenarios, as described below with reference to the following figures.

Figure 4A:
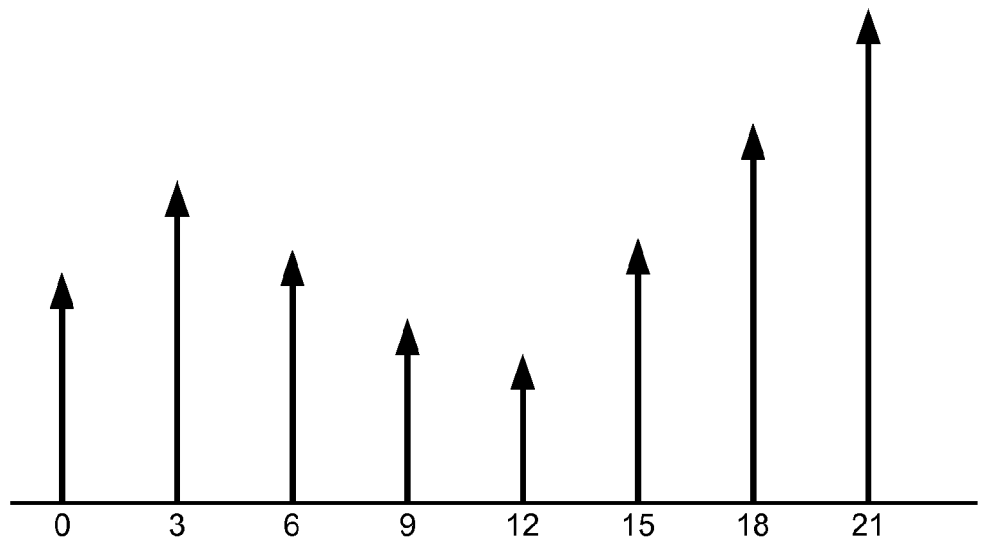
FIG. 4A illustrates pilot subcarrier spacing with pilot subcarrier locations every three subcarriers in accordance with an embodiment of the invention.

FIG. 4A shows a pilot subcarrier pattern with pilot subcarriers spaced every three subcarriers. In one embodiment, this pilot subcarrier pattern or another pilot subcarrier pattern is used as an effective pilot subcarrier pattern. In this way, a single interpolation coefficient set 308 corresponding to the effective pilot subcarrier pattern may be used, and OFDM-based signals with different pilot subcarrier patterns may be modified to conform to or be compatible with the effective pilot subcarrier pattern. For example, the pilot subcarrier pattern shown in FIG. 4B has pilot subcarriers spaced every six subcarriers, instead of every three subcarriers. Instead of generating a different interpolation coefficient set 308 for the pilot subcarrier pattern spaced every six subcarriers, the pilot subcarrier pattern shown in FIG. 4B may be modified by the pilot channel estimator 302 to be compatible with the effective subcarrier pattern spaced every three subcarriers.

Figure 4B:
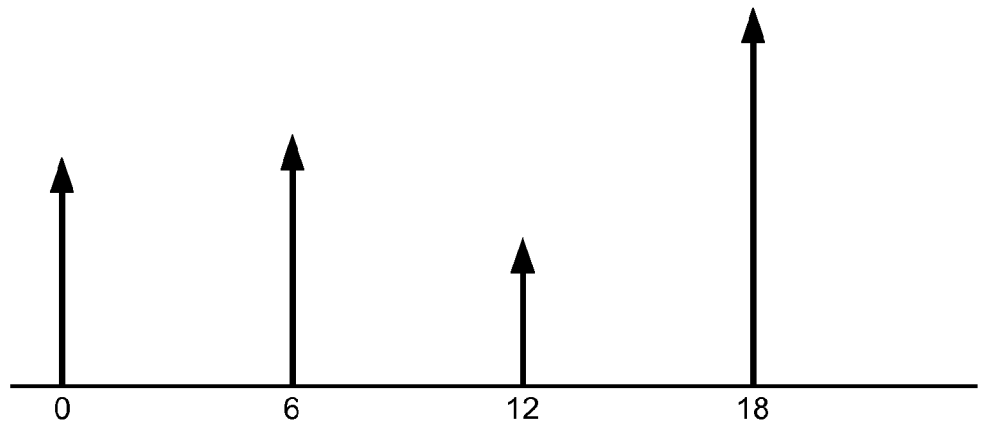
FIG. 4B illustrates pilot subcarrier spacing with pilot subcarrier locations every six subcarriers in accordance with another embodiment of the invention.
Figure 4C:
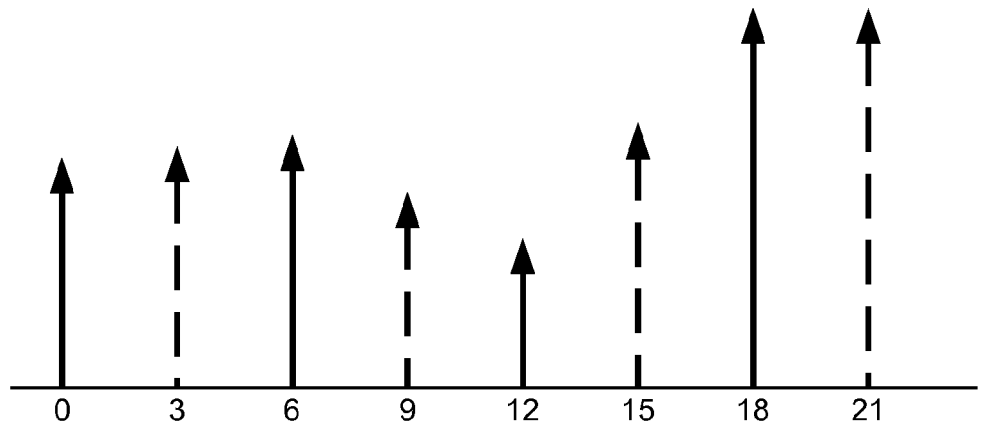
FIG. 4C illustrates estimated pilot subcarrier values between the pilot subcarrier locations of FIG. 4B in accordance with an embodiment of the invention.

FIG. 4C shows an implementation for modifying the pilot subcarrier pattern spaced every six subcarriers to be compatible with the effective pilot subcarrier pattern spaced every three subcarriers. Instead of deriving a new set 308 of interpolation coefficients for the larger pilot subcarrier spacing, the channel response in the "missing" pilot locations (e.g., locations 3, 9, 15, 21, and so on) are estimated in order to match the effective pilot subcarrier spacing of three. This estimation process is easier than deriving a new interpolation coefficient set 308 because the number of missing pilot locations is smaller than the number of subcarriers that would otherwise be interpolated. Embodiments of this estimation process are well-suited to situations where a pilot subcarrier spacing is an integer multiple greater than an effective pilot subcarrier spacing. For example, if the effective pilot subcarrier spacing is three, then this estimation process is well-suited for larger pilot subcarrier spacings of six (i.e., 3 multiplied by 2), nine (i.e., 3 multiplied by 3), and so forth.

Various methods for estimating missing pilot locations may be implemented. For example, adjacent pilot subcarriers on either side of the missing pilot subcarrier may be used to linearly interpolate a pilot channel value for the missing pilot subcarrier. In this manner, the same interpolation coefficients designed for the pilot subcarrier spacing of three can be used for the pilot subcarrier spacing of six after the missing pilot subcarriers have been interpolated. Hence, receiver memory resources may be spared from storing an additional interpolation coefficient set 308 for the pilot subcarrier spacing of six. Additionally, the channel estimation device 214 may avoid computing a unique coefficient set 308 for the pilot subcarrier spacing of six.

Figure 5B:
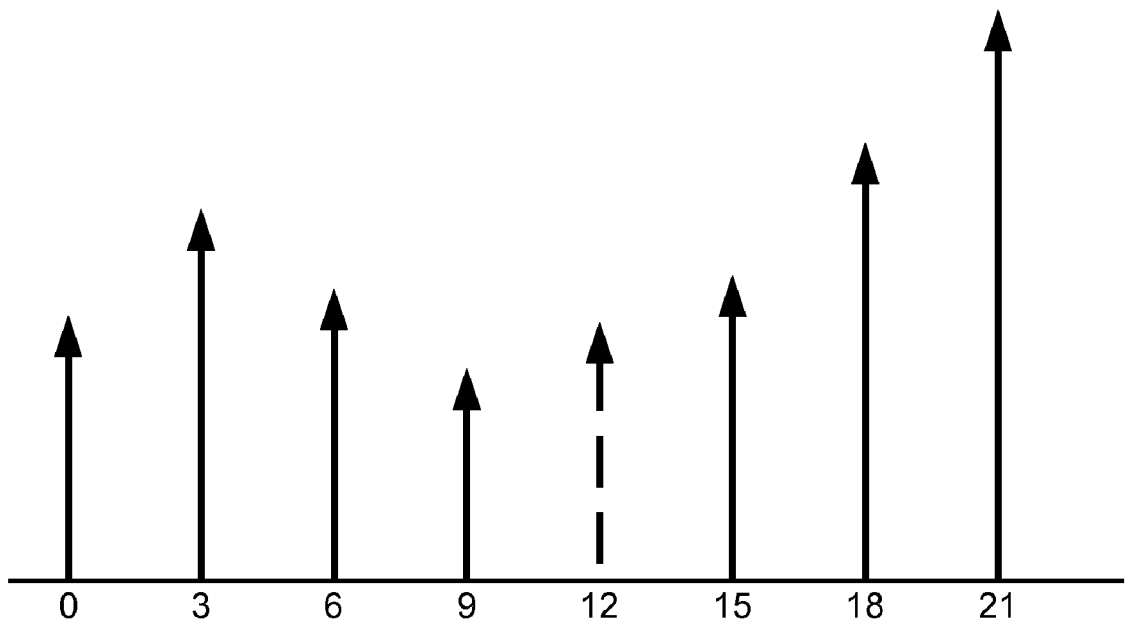
FIG. 5B illustrates an estimated pilot subcarrier value at the missing pilot subcarrier location of FIG. 5A, in accordance with an embodiment of the invention.

FIGS. 5A and 5B show another implementation for modifying a pilot subcarrier pattern with a missing pilot subcarrier by the pilot channel estimator 302. In particular, FIG. 5A shows pilot subcarriers spaced every three subcarriers, except at location 12 which is a zero value resulting from a DC subcarrier. Deriving new interpolation coefficients around this missing pilot location would increase the implementation complexity, such as the receiver memory, the computation requirement, or both. However, the pilot channel value corresponding to the missing location may be estimated, as shown in FIG. 5B, so that the interpolation coefficient set 308 for the pilot subcarrier spacing of three may be used to interpolate the data channel values. In one embodiment, the pilot channel value of the missing location is interpolated from the adjacent pilot subcarriers. For example, the pilot channel value for location 12 may be linearly interpolated from the pilot subcarriers at locations 9 and 15. Alternatively, other types of estimation techniques may be implemented.

Figure 6A:
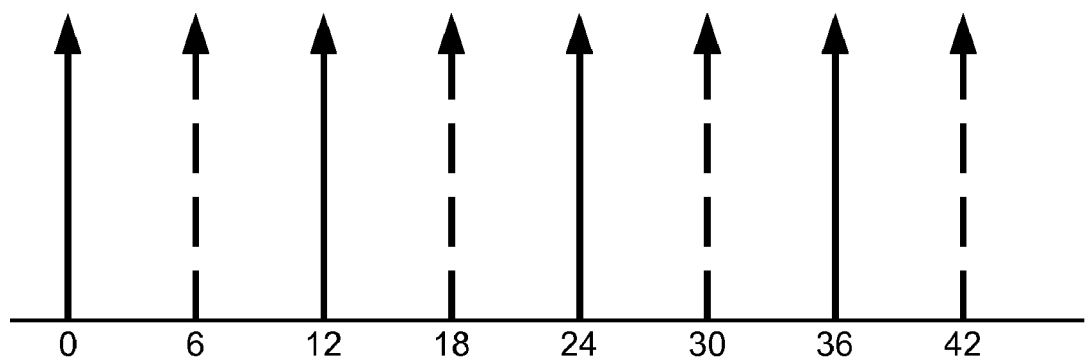
FIG. 6A illustrates a pilot subcarrier pattern resulting from a combination of two OFDMA symbols in order to reduce the effective pilot subcarrier spacing in accordance with an embodiment of the invention.
Figure 6B:
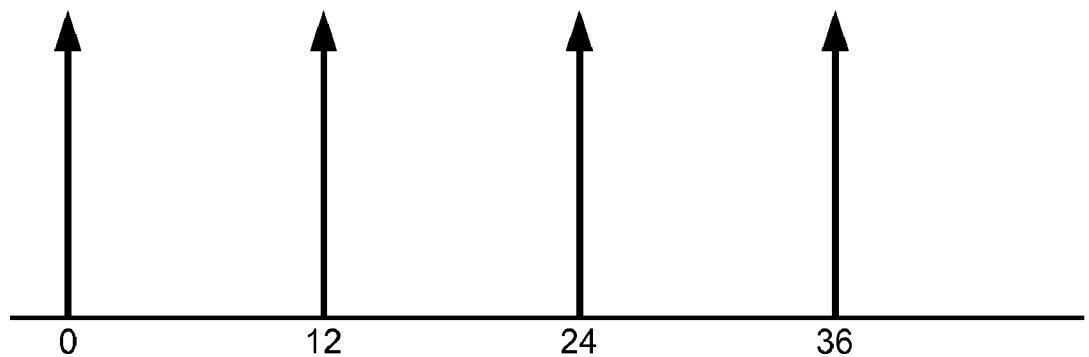
FIG. 6B illustrates a first OFDMA symbol with a pilot subcarrier spacing of twelve in accordance with an embodiment of the invention.
Figure 6C:
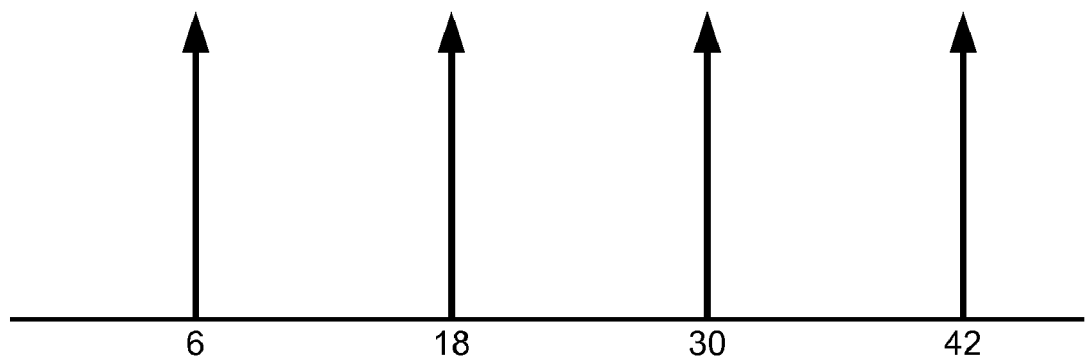
FIG. 6C illustrates a second OFDMA symbol with a pilot subcarrier spacing of twelve, offset from the first OFDMA symbol shown in FIG. 6B, in accordance with an embodiment of the invention.

FIGS. 6A through 6C show another implementation for modifying a pilot subcarrier pattern by the pilot channel estimator 302. In particular, FIG. 6A shows the combined pilot subcarrier pattern resulting from the combination of two OFDMA symbols. A first OFDMA symbol is shown in FIG. 6B with a pilot subcarrier spacing of twelve. A second OFDMA symbol is shown in FIG. 6C also with a pilot subcarrier spacing of twelve, except that the pilot subcarriers of the second OFDMA symbol (e.g., 6, 18, 30, and 42) are offset by six subcarrier locations from the pilot subcarriers of the first OFDMA symbol (e.g., 0, 12, 24, and 36).

In wireless transmission systems which are characterized by fading channel values that change very slowly over multiple OFDMA symbols, the pilot subcarriers from multiple OFDMA symbols may be combined in order to make the resulting pilot subcarrier spacing equal to an effective pilot subcarrier spacing for which an interpolation coefficient set 308 is already computed and available. For example, the OFDMA symbols shown in FIGS. 6B and 6C, each having a pilot subcarrier spacing of twelve, may be combined to make a resulting pilot subcarrier spacing of six. Hence, the interpolation coefficient set 308 designed for pilot subcarrier spacing of six can be used to take advantage of increased pilot density.

It should also be noted that combining multiple OFDMA symbols may be precluded if the data frame is not long enough to generate multiple OFDMA symbols. However, even if it is not possible to combine multiple OFDMA symbols in some embodiments, each OFDMA symbol can nevertheless be generated and transmitted in the data frame with the original pilot subcarrier spacing, and the pilot subcarrier spacing may be effectively reduced by estimating missing pilot subcarrier locations, as described above. For example, the OFDMA symbol of FIG. 6B may be modified by computing pilot channel values for the pilot subcarrier locations 6, 18, 30, and 42 by interpolation using the pilot channel values as the pilot subcarrier locations 0, 12, 24, 36, and so on. Embodiments of this estimation process are well-suited to situations where the offset between pilot subcarrier locations is a fraction of the pilot subcarrier spacing. For example, if the effective pilot subcarrier spacing is twelve, then this estimation process is well-suited for combining symbols offset, for example, by six (i.e., one half of twelve).

Although the channel estimation device 214 has been described as being used in an OFDMA system, the channel estimation device 214 may be used in any OFDM-based wireless communication system. Thus, the described channel estimation device 214, or another similar channel estimation device, can be used to estimate channel values on any OFDM-based signals.

Figure 7:
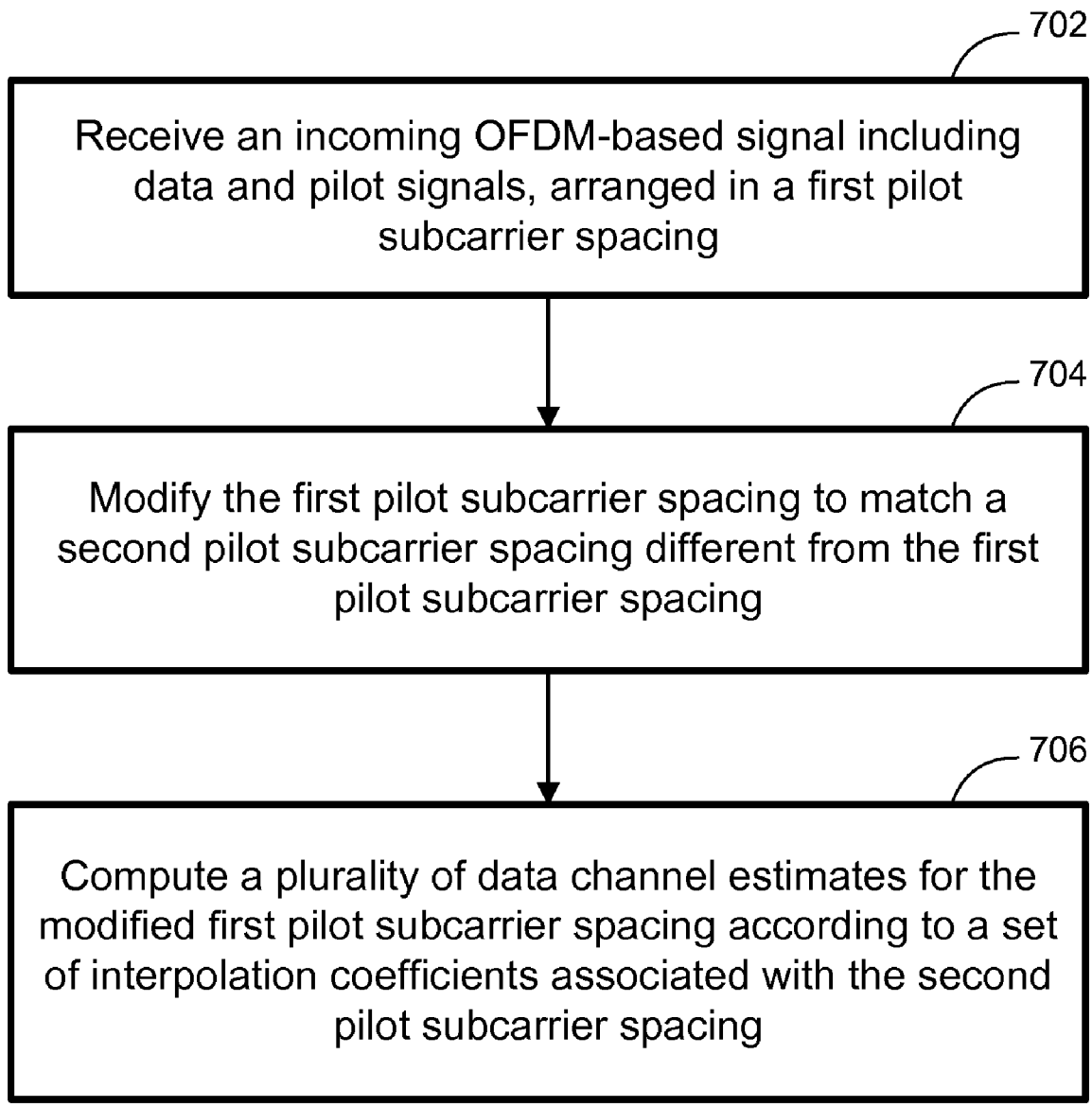
FIG. 7 is a process flow diagram of a method for performing channel estimation for an OFDM-based wireless communication system in accordance with an embodiment of the invention.

A method for performing channel estimation for an OFDM-based wireless communication system in accordance with an embodiment of the invention will be described with reference to a flow diagram of FIG. 7. At block 702, an incoming OFDM-based signal including data and pilot signals is received. The pilot signals of the received OFDM-based signal are arranged in a first pilot subcarrier spacing. For example, the pilot signals may be arranged in a pilot subcarrier spacing of six, as shown in FIG. 4B. Next, at block 704, the first pilot subcarrier spacing is modified to match a second pilot subcarrier spacing which is different from the first pilot subcarrier spacing. For example, the pilot subcarrier spacing of six may be modified to a pilot subcarrier spacing of three, as shown in FIG. 4C. Next, at block 706, a plurality of data channel values are computed for the modified first pilot subcarrier spacing. The data channel values are computed according to a set of interpolation coefficients associated with the second pilot subcarrier spacing. For example, the data channel values for the original pilot subcarrier spacing of six may be calculated using a set of interpolation coefficients for the pilot subcarrier of three, after the pilot subcarrier spacing of six is modified to the pilot subcarrier spacing of three, as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing channel estimation for an OFDM-based wireless communication system, said method comprising:

receiving an incoming OFDM-based signal including data and pilot signals, said pilot signals arranged in a first pilot subcarrier spacing across a plurality of subcarriers;

modifying said first pilot subcarrier spacing across said plurality of subcarriers to match a second pilot subcarrier spacing across said plurality of subcarriers, said second pilot subcarrier spacing being different from said first pilot subcarrier spacing; and computing a plurality of data channel values for said modified first pilot subcarrier spacing according to a set of interpolation coefficients associated with said second pilot subcarrier spacing.

2. The method of claim 1 wherein said modifying said first pilot subcarrier spacing comprises interpolating a pilot channel value between adjacent pilot subcarriers.

3. The method of claim 2 wherein said interpolating said pilot channel value between said adjacent pilot subcarriers comprises computing said pilot channel value at a missing pilot location of said second pilot subcarrier spacing.

4. The method of claim 2 wherein said interpolating said pilot channel value between said adjacent pilot subcarriers comprises computing said pilot channel value at an intermediate location between said adjacent pilot subcarriers, wherein said first pilot subcarrier spacing is an integer multiple greater than said second pilot subcarrier spacing.

5. The method of claim 1 wherein said modifying said first pilot subcarrier spacing comprises combining a plurality of symbols in said OFDM-based signal, wherein said plurality of symbols are offset by a fraction of said first pilot subcarrier spacing.

6. The method of claim 1 wherein said pilot signals are variably spaced within a symbol of said OFDM-based signal.

7. The method of claim 1 wherein said pilot signals are variably spaced across different symbols of said OFDM-based signal.

8. The method of claim 1 wherein said computing said plurality of data channel values for said modified first pilot subcarrier spacing is independent of computing a unique set of interpolation coefficients associated with said first pilot subcarrier spacing.

9. A channel estimation device comprising:
   a pilot channel estimator configured to compute pilot channel values for pilot signals of an incoming OFDM-based signal, said pilot channel values arranged in a first pilot subcarrier spacing across a plurality of subcarriers, said pilot channel estimator being configured to modify said first pilot subcarrier spacing across said plurality of subcarriers to match a second pilot subcarrier spacing across said plurality of subcarriers different from said first pilot subcarrier spacing; and
   a data channel estimator coupled to said pilot channel estimator, said data channel estimator configured to compute data channel values for data signals of said incoming OFDM-based signal from said pilot channel values using a set of interpolation coefficients associated with said second pilot subcarrier spacing.

10. The device of claim 9 wherein said pilot channel estimator is further configured to interpolate a pilot channel value between adjacent pilot sub carriers.

11. The device of claim 10 wherein said pilot channel estimator is further configured to compute said pilot channel value at a missing pilot location of said second pilot subcarrier spacing.

12. The device of claim 10 wherein said pilot channel estimator is further configured to compute said pilot channel value at an intermediate location between said adjacent pilot subcarriers, wherein said first pilot subcarrier spacing is an integer multiple greater than said second pilot subcarrier spacing.

13. The device of claim 9 wherein said pilot channel estimator is further configured to combine a plurality of symbols in said OFDM-based signal, wherein said plurality of symbols are offset by a fraction of said first pilot subcarrier spacing.

14. The device of claim 9 wherein said pilot signals are variably spaced within a symbol of said OFDM-based signal.

15. The device of claim 9 wherein said pilot signals are variably spaced across different symbols of said OFDM-based signal.

16. The device of claim 9 wherein said data channel estimator is further configured to compute said plurality of data channel values for said modified first pilot subcarrier spacing independently of a unique set of interpolation coefficients associated with said first pilot subcarrier spacing.

17. An OFDM-based receiver comprising:
    means for receiving an OFDM-based signal, said OFDM-based signal including data and pilot signals, said pilot signals arranged in a first pilot subcarrier spacing across a plurality of subcarriers;
    means for modifying said first pilot subcarrier spacing across said plurality of subcarriers to match a second pilot subcarrier spacing across said plurality of subcarriers, said second pilot subcarrier spacing being different from said first pilot subcarrier spacing; and
    means for using a set of interpolation coefficients to interpolate data channel values for said data signals, wherein said set of interpolation coefficients corresponds to an effective pilot subcarrier spacing across said plurality of subcarriers different from said first pilot subcarrier spacing across said plurality of subcarriers.

18. The OFDM-based receiver of claim 17 further comprising means for interpolating said pilot channel value at a missing pilot location of said effective pilot subcarrier spacing.

19. The OFDM-based receiver of claim 17 further comprising means for interpolating said pilot channel value at an intermediate location between adjacent pilot subcarriers, wherein said first pilot subcarrier spacing is an integer multiple greater than said effective pilot subcarrier spacing.

20. The OFDM-based receiver of claim 17 wherein said means for using said set of interpolation coefficients is configured to compute said plurality of data channel values for said effective pilot subcarrier spacing independently of a unique set of interpolation coefficients associated with said first pilot subcarrier spacing.

* * * * *